H. C. SANKEY.
PROTECTIVE COVERING FOR RUBBER TIRES.
APPLICATION FILED SEPT. 20, 1920.
1,381,345.
Patented June 14, 1921.
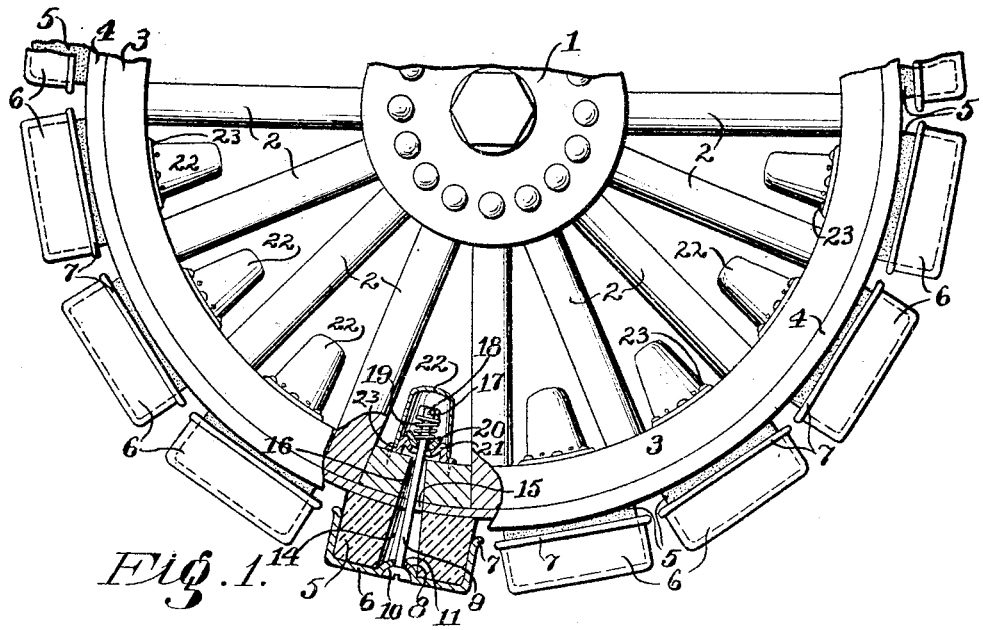
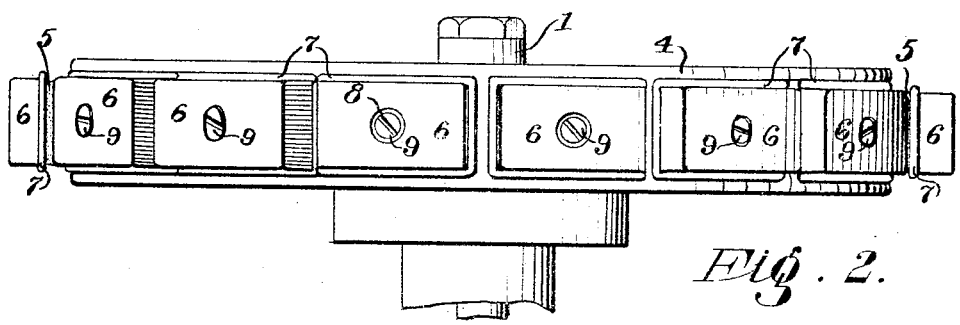
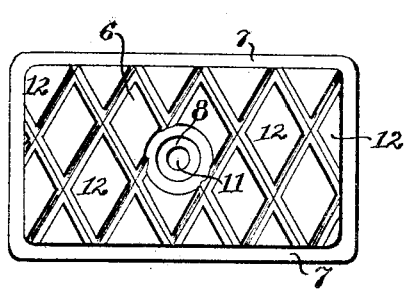
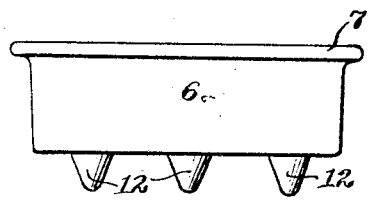
INVENTOR
HENRY C. SANKEY

UNITED STATES PATENT OFFICE.

HENRY C. SANKEY, OF ST. LOUIS, MISSOURI.

PROTECTIVE COVERING FOR RUBBER TIRES.

1,381,345. Specification of Letters Patent. Patented June 14, 1921.

Application filed September 20, 1920. Serial No. 411,468.

*To all whom it may concern:*

Be it known that I, HENRY C. SANKEY, a citizen of the United States, residing at St. Louis, Missouri, have invented certain new and useful Improvements in Protective Coverings for Rubber Tires, of which the following is a specification containing a full, clear, and exact description, reference being had to the accompanying drawings, forming a part thereof.

My invention consists in the novel construction and combination of parts hereinafter particularly described, and distinctly claimed.

The object of my invention is to provide an improved protective covering or cap, for what are known as rubber-block tires; which will prevent the wearing away of the treads of said rubber blocks, as well as protect the same from being cut by glass and other sharp objects in the road; which will also act as a non-skid device, and at the same time be so flexible that it will not interfere to any appreciable extent with the resiliency of the rubber blocks.

In the drawings,

Figure 1 is a side-elevation, partly in section, of a portion of an automobile truck-wheel having my invention applied thereto.

Fig. 2 is an inverted plan-view of the same.

Fig. 3 is an enlarged detail plan-view of one of the protecting caps, showing the tread thereof provided with one form of projections, to increase the traction thereof, and to prevent shipping and skidding, and Fig. 4 is a side-elevation of one of the protecting caps, with a modified form of traction-increasing projections on its tread.

The numeral 1 designates the hub of any of the wheels now in use, whether they be of the form herein shown, or of other construction, either with wood or metal spokes.

Said hub 1 is provided with the spokes 2, at the outer ends of which the felly 3 is mounted or otherwise located.

Mounted upon said felly 3 is the well-known metallic tire-rim 4 in which are formed (as usual) the seats for the rubber blocks 5, which latter may be rectangular, circular or of any other form.

Any desired number of the said rubber blocks or cushions 5 may be used, either as herein shown, or in any other relative arrangement heretofore used upon the wheels of trucks, or electric-automobiles whether used for pleasure or for business purposes.

The numeral 6 designates the metallic covering or cap, which may be made in any shape to fit over the tread of the said rubber tire blocks or cushions 5, whether the latter be circular, rectangular, or oblong in plan-view.

As shown, I provide a separate cap 6 for each one of said rubber-tire blocks 5; said caps being formed hollow, out of either cast or stamped metal, so that the cap will fit upon said blocks and cover and protect the tread and side edges thereof from being worn or cut during use, the free marginal edges of the caps being flared or turned outwardly at 7, to prevent catching and cutting of the rubber by said edges.

Formed in the center of the tread of each cap 6 is a circular pocket or cavity 8, the walls of which project inwardly, and are curved to form a ball-and-socket joint between a cap-bolt 9 and its cap, said bolt having a rounded head 10, and passing through a perforation 11 at the base of said pocket.

Said perforation 11 at the base of the said pocket 8 is of greater diameter than the bolt, so that the latter will not be bent or broken when the cap 6 is rocked or otherwise moved upon the rubber tire-block which supports it, during use; thereby allowing said cap to move in any direction.

The treads of the cap 6 may be smooth, or they may be made with any of the well known forms of projections, serrations, or the like 12, as shown in Figs. 3 and 4, as required for the service to be performed, and as indicated by the tractive effort to be performed upon good or bad roads. Caps having different forms of treads may be used interchangeably, to meet the local condition of the road.

The cap-bolt 9 extends inwardly into and through a flared or conical passage 14 formed in the rubber tire-block 5, and thence into and through a perforation 15 in said rim 4, and thence into and through a flaring passage or perforation 16 that is formed in said felly 3, so that the lateral and longitudinal movements of said bolt will be free in all of said parts. See Fig. 1.

The inner end of said bolt 9 is threaded and provided with a suitable castellated or other common form of nut 17, which is locked upon said bolt by means of a pin or cotter 18.

A coiled spring 19 is mounted upon said bolt 9 between said nut 17 and a cup-shaped washer 20, which latter engages a socket-bearing 21 that is secured to the felly 3 at the inner end of said flaring passage in said felly, so that there is a ball-and-socket connection between the inner end of said bolt and said felly, to freely permit the head of the bolt to move laterally with its cap, without throwing a lateral strain on said bolt.

The bolt 9 may also move freely in a longitudinal direction, as the rubber tire-block 5 is compressed and released, during use, while said spring acts to yieldingly hold said cap in position upon the rubber block which carries it.

Said nut 17 may be adjusted when desired, to give the correct pull upon said cap, in holding the latter firmly on its rubber tire-block or cushion.

A suitable cover 22 is provided with a perforated flange at its inner end, and is secured in position over the said nut 17, spring 19, cup-shaped washer 20, and socket-bearing 21, to protect the same from mud, rain, dust, and snow.

Screws 23, or other common fastening devices, removably secure the said cover to the said felly.

In case the wheel is made of cast-metal, the said socket-bearing 21 would of course be cast integral with the felly.

I claim:

The combination with a wheel-felly, a metallic rim on said felly, rubber-blocks seated on said metallic rim, there being registering flaring passages in said rubber-blocks, felly and rim; of hollow protective metal caps seated on the treads of said rubber-blocks and having sockets located in alinement with said registering passages of said felly, rim and rubber-blocks; a long bolt having a rounded head at its outer end seated in the socket of each of said caps, and the body of said bolt extending through the said registering flaring passages and projecting a distance beyond the inner surface of said felly; a nut on the inner end of said bolt; a socket-bearing secured to the inner surface of said felly; a cup-shaped washer on said socket-bearing; a spring mounted on said bolt in the space between said cup-shaped washer and said nut; and a cover secured at its inner end to the said socket-bearing and inclosing the inner end of said bolt and all of the parts that are located on the inner portion of the latter.

HENRY C. SANKEY.

Witnesses:
WINIFRED McHALE,
JOHN C. HIGDON.